United States Patent
Groeger (10) Patent No.: US 7,230,634 B2
(45) Date of Patent: Jun. 12, 2007

(54) METHOD FOR GENERATING CHARGE IMAGES OF IMAGES TO BE PRINTED ON A MOVING PHOTOCONDUCTIVE INTERMEDIATE SUPPORT OF AN ELECTROGRAPHIC PRINTING OR COPYING DEVICE

(75) Inventor: Hans-Detlef Groeger, Poing (DE)

(73) Assignee: Oce Printing Systems GmbH, Poing (DE)

( * ) Notice: Subject to any disclaimer, the term of this patent is extended or adjusted under 35 U.S.C. 154(b) by 382 days.

(21) Appl. No.: 10/493,674

(22) PCT Filed: Oct. 24, 2002

(86) PCT No.: PCT/EP02/11909

§ 371 (c)(1),
(2), (4) Date: Sep. 13, 2004

(87) PCT Pub. No.: WO03/036937

PCT Pub. Date: May 1, 2003

(65) Prior Publication Data

US 2005/0018035 A1 Jan. 27, 2005

(30) Foreign Application Priority Data

Oct. 24, 2001 (DE) ................. 101 52 389

(51) Int. Cl.
*G03G 13/05* (2006.01)
*G03G 15/05* (2006.01)
*B41J 2/45* (2006.01)

(52) U.S. Cl. ...................................... 347/131
(58) Field of Classification Search ............. 347/131, 347/238, 237
See application file for complete search history.

(56) References Cited

U.S. PATENT DOCUMENTS 5,917,535 A * 6/1999 Corona .................. 347/238
6,292,205 B1 * 9/2001 Nakayasu et al. .......... 347/131

* cited by examiner

*Primary Examiner*—Huan Tran
(74) *Attorney, Agent, or Firm*—Schiff Hardin LLP (57) ABSTRACT

A method and arrangement for producing charge images of images to be printed in an electro-photographic printer or copier device. The method and arrangement provides for printing of different gray scale levels on the print medium by controlling LEDs that are directed toward a photo-conducting intermediate image carrier to emit a different number of successive light pulses. The number of pulses depends on the gray scale level of the raster image portion. The light pulses overlap on the intermediate image carrier to effect correspondingly different charge levels. The intermediate carrier is developed by the application of toner and the toner is transferred to the print medium.

15 Claims, 8 Drawing Sheets

METHOD FOR GENERATING CHARGE IMAGES OF IMAGES TO BE PRINTED ON A MOVING PHOTOCONDUCTIVE INTERMEDIATE SUPPORT OF AN ELECTROGRAPHIC PRINTING OR COPYING DEVICE

BACKGROUND OF THE INVENTION

1. Field of the Invention

The present invention relates generally to an electrophotographic printer or copier, and, in particular, to an apparatus for exposing a photoconductive intermediate image carrier of the printer or copier with different gray scale levels using a light source.

2. Description of the Related Art

Electrographic printing or copying devices are known (as shown for example in European patent document EP 0 683 954 B1). Such a printing device contains a driven intermediate support, which may be a photo-conducting drum, on which charge images of images to be printed are generated. The charge images have toner applied to them, the toner is transferred to a print medium, such as paper, and the toner is fused onto the print medium. To accomplish this, the printing device contains the following components grouped around the intermediate support: an exposure device (which is a character generator), a developer station, a transfer station, a cleaning station and a charge device. The charge device is used to charge the intermediate support to, for example, 500 Volts and then for generation of the charge images of the images to be printed with the exposure device to, for example, approximately 70 Volts. The charge images then have toner applied to them in the usual manner in the developer station. The transition from toner to the intermediate support however only takes place if sufficient current exists between the developer station, specifically the developer roller, and the discharged regions of the intermediate support. For instance, if the developer roller has a potential of 220 Volts and the charge images on the intermediate support have a potential of about 70 Volts, then a field results, which takes the toner from the developer station to the intermediate support. The potential must be reduced at least by means of a discharge of the intermediate support in order to make it possible to ink the intermediate support. This reduction in potential will be referred to in the following as a development threshold or development level. In the transfer station, the toner images are then transferred to the print medium. Finally, in the cleaning station the intermediate support is cleaned of residual toner. With that a new print operation can start.

From European patent document EP 0 683 954 B1, which is incorporated herein by reference, it is known to use LEDs (light emitting diodes) as an exposure device. Generally, these are arranged in a comb of adjacent LEDs, the comb lying at a right angle to the moving direction of the intermediate support. The image to be printed is broken down into rows and columns of raster cells (also referred to as macro-pixels), whereby the raster cells are further divided into output pixels (micro-pixels) and an LED is assigned to each output pixel. In order to generate raster cells with different gray levels, individual output pixels of the raster cell can be exposed accordingly. In order to further increase the number of gray level steps, the LEDs can be used in a multi-level operation, i.e. the emitted light energy can be changed by means of variation of the turn-on time and/or of the field current of the LEDs. A realization of such a multi-level operation is described in the above cited European patent document EP 0 683 954 B1.

European patent document EP 0 663 760 A1 also describes a digital LED printer with an LED comb, in which printed images of different gray levels are generated by modulating the exposure time of the LEDs.

A further arrangement with which an LED comb can be controlled is disclosed in U.S. Pat. No. 4,750,010. Once again the gray level of a raster cell of the printed image is set by the duration of the light pulses of the LED allocated to the raster cell.

U.S. Pat. No. 5,255,013 describes an LED printer head which provides one LED per raster cell (pixel) from a comb of LEDs and in which the gray level of the image to be printed that has been divided into raster cells is generated per raster cell by means of a series of successive rapid light pulses of the allocated LED.

In European patent document EP 1 018 834 A2 a character generator with LEDs is described, in which the light energy of the individual LEDs is set up in such a way that a desired dot can be generated on an intermediate support and the dot printed on the print material. In the process the fact is taken into consideration that the discharge curves of adjacent dots mutually influence each other. The light energy of the LED generating the dot on the intermediate support is set up in such a way that it does not become too great and does not discharge the intermediate support too strongly. The light energy is determined in the process by the light emission per LED and per time. To carry out this method, the light energies to be emitted for each LED (and each dot) must be calculated separately, which requires a time-consuming activation.

European patent document EP 0 564 868 A2 described a character generator which uses a laser to generate images on an intermediate support. Differing gray levels of the individual pixels in a row direction are generated as a result of activating the laser with an appropriate pulse width signal. To achieve a sharp edge in the transition on the border of an image, the pulse width signals fed to the laser of the pixels on the border are shifted in the direction of the nearest pixel within the image. Since the laser is fed with pulse width signals of variable width per pixel, the laser emits variable light energies per pixel.

European patent document EP 0 663 760 A1 describes an LED printer which exhibits a control architecture, with which a multitude of gray levels can be generated. To achieve a light emission for the LEDs that is independent of the properties of the individual LEDs, the characteristic properties of the individual LEDs are measured, a correction signal is taken from this information which is then fed to the activation circuit for the LEDs and is combined with the activation signal for the LEDs.

European patent document EP 0 388 833 A2 discloses an additional character generator with LEDs. Here a correction of the activation signals for the LEDs is also made depending on the environmental conditions.

U.S. Pat. No. 6,280,012 B1 describes a character generator for ink-jet heads. To avoid an overloading of the character generator for the case that a number of ink-jet heads are active at the same time, the ink-jet heads are combined into groups and activated in a staggered fashion.

U.S. Pat. No. 4,661,859 describes a printer with which gray levels can be printed. The data representing the gray level per pixel are fed to a counter, which correspondingly increments the value of the data. The counter status is converted into a pulse length signal, which is used for activation of a laser.

SUMMARY OF THE INVENTION

The present invention provides a method with which a multi-level operation is possible by LEDs of an exposure device (such as of a character generator) in an electrographic printing or copying device so that a uniform print image is achieved.

According to the method, charge images of images to be printed are generated on a moving photoconductive intermediate support of an electrographic printing or copying device using LEDs as light sources, the printed images are composed of rows and columns of raster cells and each column of raster cells has an LED allocated to it, each LED is activated in such a way that, during a row period in dependence of the gray level to be generated in a raster cell, it emits a number i (wherein i=1 ... n, n whole number) of sequential overlapping light pulses of equal energy, which are directed to the intermediate support and transfers these, and the light pulses of raster cells succeeding each other in a column direction that are allocated to a raster cell are combined into groups of light pulses directly following one another.

The setting of the gray level steps of the raster cells is thus achieved using the method of the invention by means of correspondingly varying the number of light pulses that impact sequentially on the intermediate support. When the printed images are constructed of raster cells arranged in rows and columns, it is advantageous for control if the light pulses emitted by the LEDs are arranged in groups in a columnar direction and immediately follow one another in the group. The light pulses of a group can always occur only in combination with a 100% exposure of a raster cell. Then it is sufficient if one LED is provided per raster cell of a row of raster cells, the raster cell being controlled in such a way that during a row period of the raster cells it emits a corresponding number of successive light pulses according to the gray level to be generated, whereby a gray level (not white) is generated when the discharging of the interim support caused by the light pulse crosses a development threshold.

BRIEF DESCRIPTION OF THE DRAWINGS

The invention will be explained in greater detail with reference to the figures.

DETAILED DESCRIPTION OF THE PREFERRED EMBODIMENTS

The preferred embodiments of the invention provide a process as set forth above which further includes applying the following:

Row period=1/row frequency=1/(1[row]×printing speed[m/sec]×39.37[inch/m]×resolution[rows/inch]).

To keep the costs low, it is advantageous to restrict the number of light pulses per row period to eight. However, a greater or lesser number of light pulses per row period is also possible.

The invention's solution results in the following advantages:

The discharge curve caused by the light pulse on the support medium always has the same edge steepness, whereby the edge of the discharge curve shifts laterally in the case of the addition of further light pulses, however no declines occur in the discharge curve. The result is that the printed image is uniform and does not have any irregularities due to undesired crossing of the development threshold in the opposite direction.

The discharge curve is independent of the printing speed, as long as the length of the light pulse is less than the associated time window: e.g. 8× (duration of the light pulse)≦row period of the raster cells under the requirement that a maximum of eight light pulses per raster cell be possible.

The edge steepness of the discharge curve is independent of the activation value of the LEDs.

The discharge current is independent of the color direction (white→black, black→white).

The discharge curve is independent of the correction value of the individual LEDs.

The discharge curve is independent of the form of the luminous field of the LED as long as the transferred energy per LED is identical.

The discharge curve is steadily ascending/falling between 0 and 100%.

It is not necessary to link the control value for the LEDs, which is dependent on the images to be printed, and the correction value of the LEDs, via which the different luminosities of the LEDs are corrected, for this reason control is simplified. The correction value controls the length of the light pulse of the allocated LED. The control value controls the On/Off operation of the LED.

Preferred embodiments of the method provide that the groups are formed by having the light pulses allocated to a raster whose number is less than the maximum number n, either directly precede or directly follow those light pulses allocated to a raster cell whose number is equal to n, depending on whether the raster cell lies before or after the raster cell in column direction, to which the maximum number n of light pulses is allocated. Further, the light pulses are imaged on the intermediate support in such a way that the light spot impinging on the intermediate support is larger than the raster cell. In another development, the exposure of the raster cells is divided by the LEDs into n light phases, which are equally large, whereby per light phase only one light pulse per Led is directed to the intermediate support. Preferably, the maximum number n of light pulses during a row period is equal to eight. Advantages are provided when the energy per light pulse is identical for all LEDs.

As an additional development, the method calls for a charge image on the intermediate support that has toner applied to it when the potential of the charge image generated by the light pulses on the intermediate support crosses a development threshold, the development threshold is not reached until a number j (j=1 ... m, m<n) of light pulses impinges on the raster cell. In the present method, yet another embodiment provides that the length of the light pulse emitted by the LEDs is controlled by the correction value of the LED. The activation or non-activation of the LEDs may be controlled by activation values that are dependent on the images to be printed. In one development, a comb of adjacent LEDs is used for generation of charge images on the intermediate support, whereby each raster cell has a row of an LED assigned to it. The LED of a comb may be divided into groups of LEDs, which are separately activated. Specifically, the LEDs of a group may be activated in such a way that they emit their light pulses one after the other per light phase. In one example, the group of LEDs is 128 LEDs. In further detail, the activation values for the LEDs are generated from 4 bit wide control data, are allocated light phase data of n places width via a table, in which each place specifies whether the allocated LED emits a light pulse or not.

The present invention also provides an arrangement for carrying out the method in which a controller is provided, that stores the print data of the images to be printed, that converts the print data into control data via a screening table, the control data which specify the location and number of the light pulses per LED, in which a character generator is provided, which has a control chip, which converts the control data into activation values for the LEDs, which control the lighting of the LEDs.

A preferred arrangement calls for the character generator to be designed in such a way that the comb of LEDs is divided into groups of LEDs and a control chip is allocated to each group, which selects the control data allocated to the group from the control data fed to the character generator.

The arrangement may further provide that a correction value memory is provided in the control chip, in which one correction value is stored per LED, through which it is achieved that the brightness of the LEDs is identical. As a further development, the arrangement includes the control chip which exhibits the following additional components: a data buffer, in which the control data of several rows of raster cells are stored, a flash decoder, which generates the allocated light phase data from the control data of the data buffer, and generates the activation values for the individual LEDs from the light phase data, a control unit which under control by a clock signal forwards the control data from the data buffer to the flash decoder and causes the emission of the allocated correction values from the correction value memory, one down counter per LED, whose initial value is set by the correction value and which is counted back by the clock signal, when the activation value specifies the emission of a light pulse.

Further advantages of the method include that the same amount of energy per light pulse can be selected and that a light spot on the intermediate support generated by the light pulse can be selected that is greater than the raster cell.

Advantageously the LEDs are arranged next to one another in a comb, with one LED per raster cell in row direction. In the process, for the reduction of the current increase in the case of full activation of the comb it is practical to stagger the activation of the LEDs The invention is consequently based on the idea that a single short light pulse of an LED does not leave behind any visible (that could be developed by the toner) effect on the intermediate support. However, the combination of several light pulses occurring in sequence generates, as a result of its overlay, precisely the kind of discharge curves that are needed for a multilevel operation. The shape of the light spot is not important, but rather only the arrangement, i.e. the sequence of light pulses. The resulting discharge curve is generated to a certain degree by means of synthesis.

Figure 1:
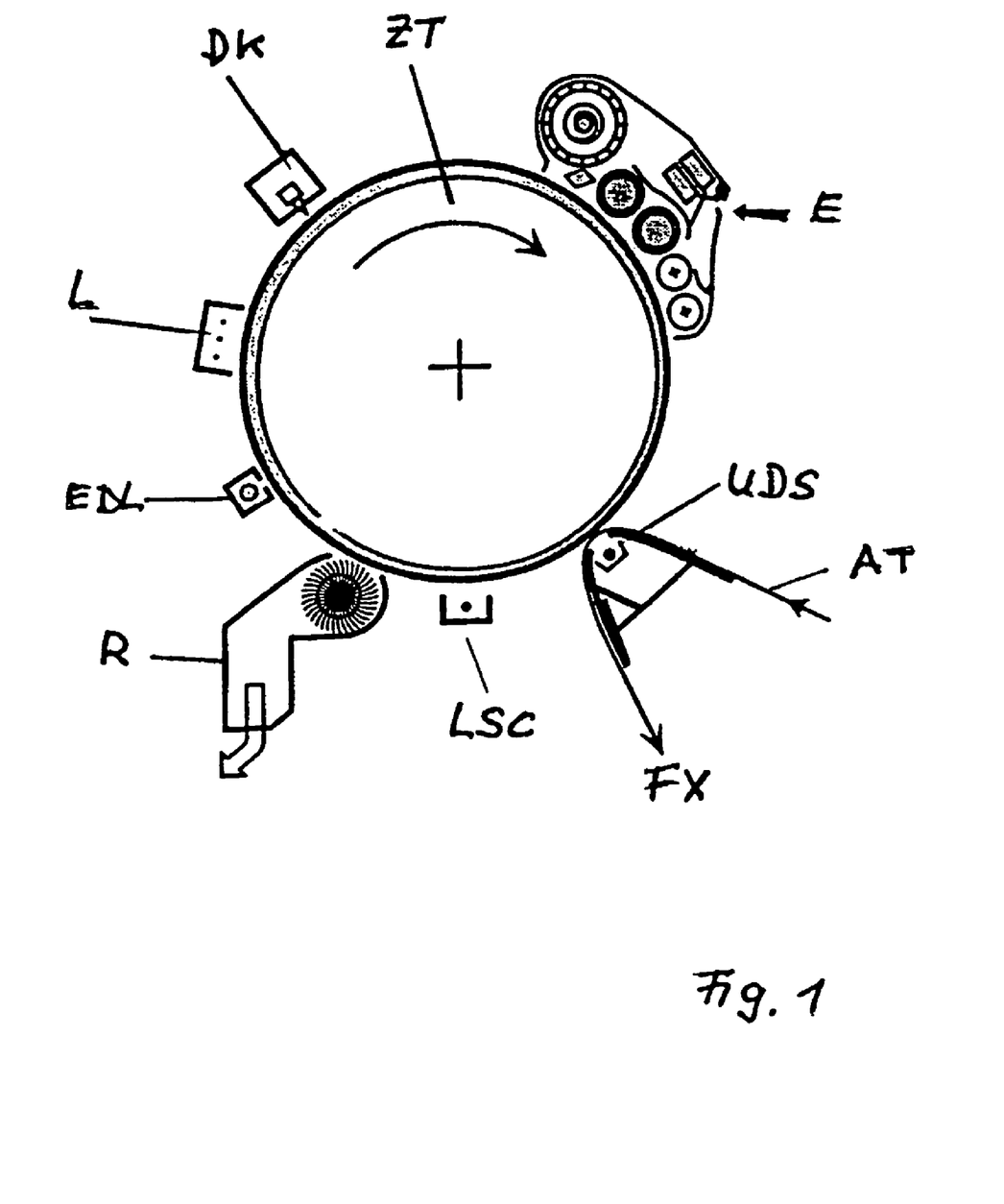
FIG. 1 is a schematic representation of the components in the case of an electro-photographic printing or copying device shown in end view.

With reference to the figures, FIG. 1 shows in basic representation the structure of an electro-photographic printing or copying device corresponding to European patent document EP 0 683 954 B1, which is incorporated herein by reference. The following components are arranged around a moving intermediate support ZT, in FIG. 1 a photo-conducting drum: a charge corotron L for charging of the intermediate support ZT; an LED character generator DK, with which the intermediate support ZT is recharged in accordance with the images to be printed and corresponding charge images are generated; a developer station E, in which the charge images on the intermediate support ZT have toner applied to them; a transfer station UDS, which transfers the toner images from the intermediate support ZT to a print medium AT, e.g. a paper path; a clear corotron LSC; a cleaning station R, with which residual toner is removed from the intermediate support ZT; a discharge lamp EDL, with which the intermediate support ZT is uniformly exposed. Shown schematically in the figure is the fact that the print medium AT is fed after transfer to a fuser station FX, in order to fuse the toner images to the print medium AT.

In the following explanation, the light flash emitted by an LED will be referred to as light pulse LI, the time period in which the light pulse is emitted will be termed light phase LP and the light pulse conducted by means of a lens of a known structure (as shown for example in the European patent document EP 0683 954 B1) that impinges on the intermediate storage will be referred to as light spot LE.

Figure 2:
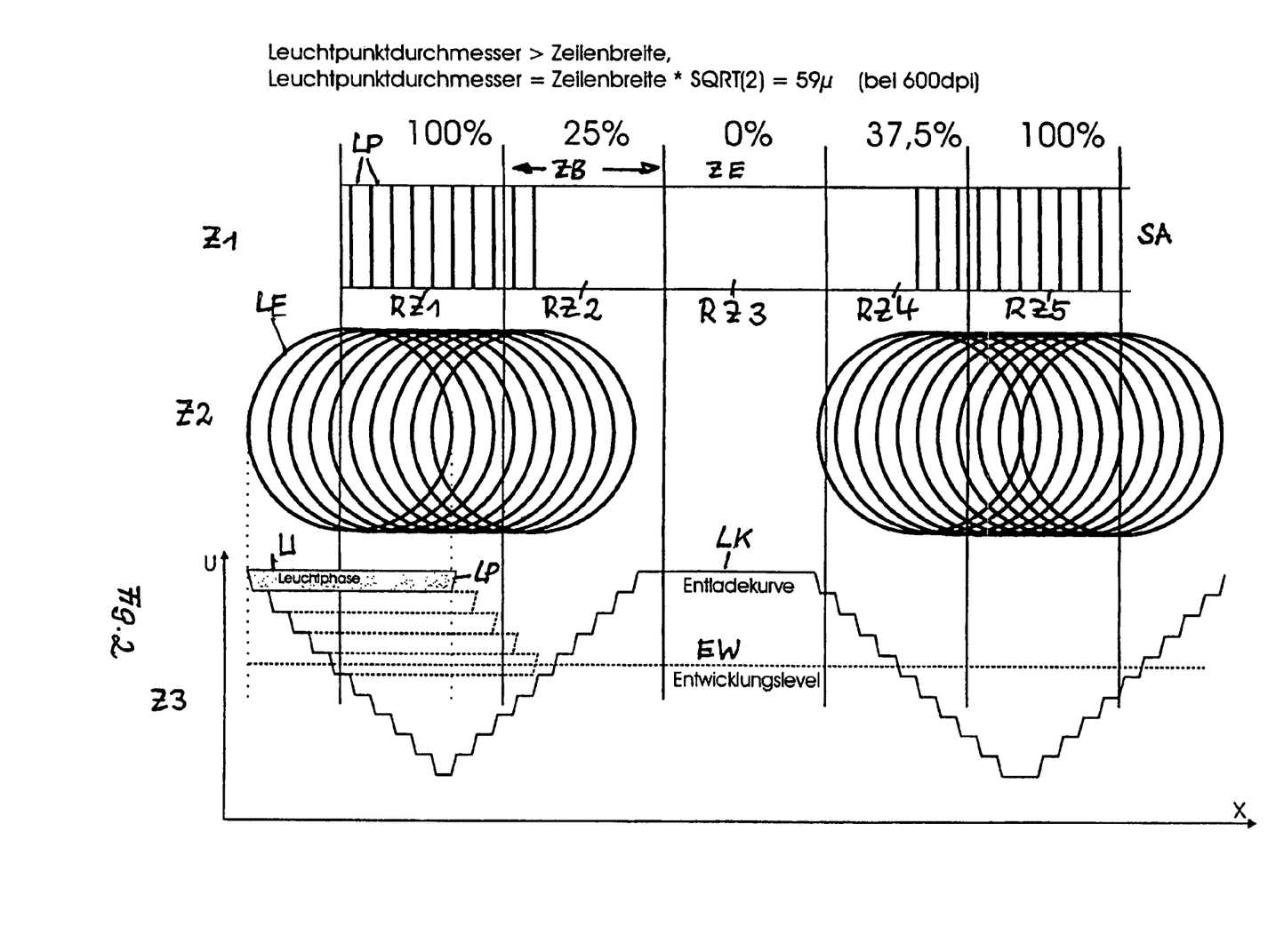
FIG. 2 is a graphical representation of the method.

FIG. 2 basically shows the execution of the method.

In the representation it is assumed that the area to be printed is divided into raster cells RZ, which are arranged in rows ZE and columns SA, whereby each raster row of a row has an LED allocated to it. In the process the light spot LE generated on the intermediate support is greater than the row width ZB of a raster cell RZ. It is further assumed that the light comb is a fixed arrangement with the LEDs, while the intermediate support moves past the LEDs. Row Z1 of FIG. 2 shows the area (a column SA in raster cells RZ) of the exposure of an intermediate support, row Z2 shows the number of the light pulses LI required for this purpose, row Z3 shows the trend of the discharge curve LK (the trend of the voltage U in the movement of the intermediate support past the LEDs is sketched) on the intermediate support, the voltage which is generated by the light pulse LI.

In the example it is assumed that in the first row Z1 raster cells RZ are represented, which are allocated to an LED. The raster cells RZ are e.g. broken down into eight light phases LP at equal intervals. In the raster cell RZ1, the case is shown that a maximum exposure and thus a discharge over the entire raster cell RZ1 occurs; i.e. in all eight light phases allocated to a raster cell the raster cell is exposed (at an exposure level=100% exposure; wherein the gray scale level=black). In the second raster cell RZ2, an exposure of 25% (that is, two light phases) of the raster cell is shown. The third raster cell RZ3 represents the case that no exposure takes place. Raster cell RZ4 represents the case that an exposure of 37.5% of the raster cell is present (in three light phases) and raster cell RZ5 represents the case that again the entire raster cell is exposed (in eight light phases). From the representation of row Z1 it can be inferred that a partial exposure of a raster cell RZ always occurs with a 100% exposed raster cell RZ, whereby the partially exposed raster cells are directly before or after the 100% exposed raster cell. In this way the discharged area is enlarged over a 100% raster cell and thus sets the gray scale level of the area.

The next row Z2 of FIG. 2 shows the number and location of the light spots LE (represented basically as a circle) generated by the light pulses LI on the intermediate support, the light spots which are generated by the LED and which are larger than one raster cell RZ. The number of the light pulses per raster cell RZ depends on the gray level which is to be generated in the raster cell. Only in cases when the number of the light pulses LI directly following one another is such that the discharge of the intermediate support caused by them exceeds the development threshold EW (referred to as development level in FIG. 5) of the intermediate support (Row Z3) is a sufficient discharge of the intermediate support given, in order to make possible an application of toner to the intermediate support.

In the row Z3 shown in FIG. 2 the light phases LP of the light pulses LI are shown. It can be recognized that the light pulses LI directly follow one another. In the process, the case is used as a basis that per row width ZB (raster cell width) a maximum of eight light pulses are emitted. If all eight light phases are used, a 100% exposure is achieved. The energy per light pulse (e.g. in micro-joules) can be identical for all of the LEDs. The compensation of the LEDs can take place through current and/or flash duration within the light phases.

Figure 3:
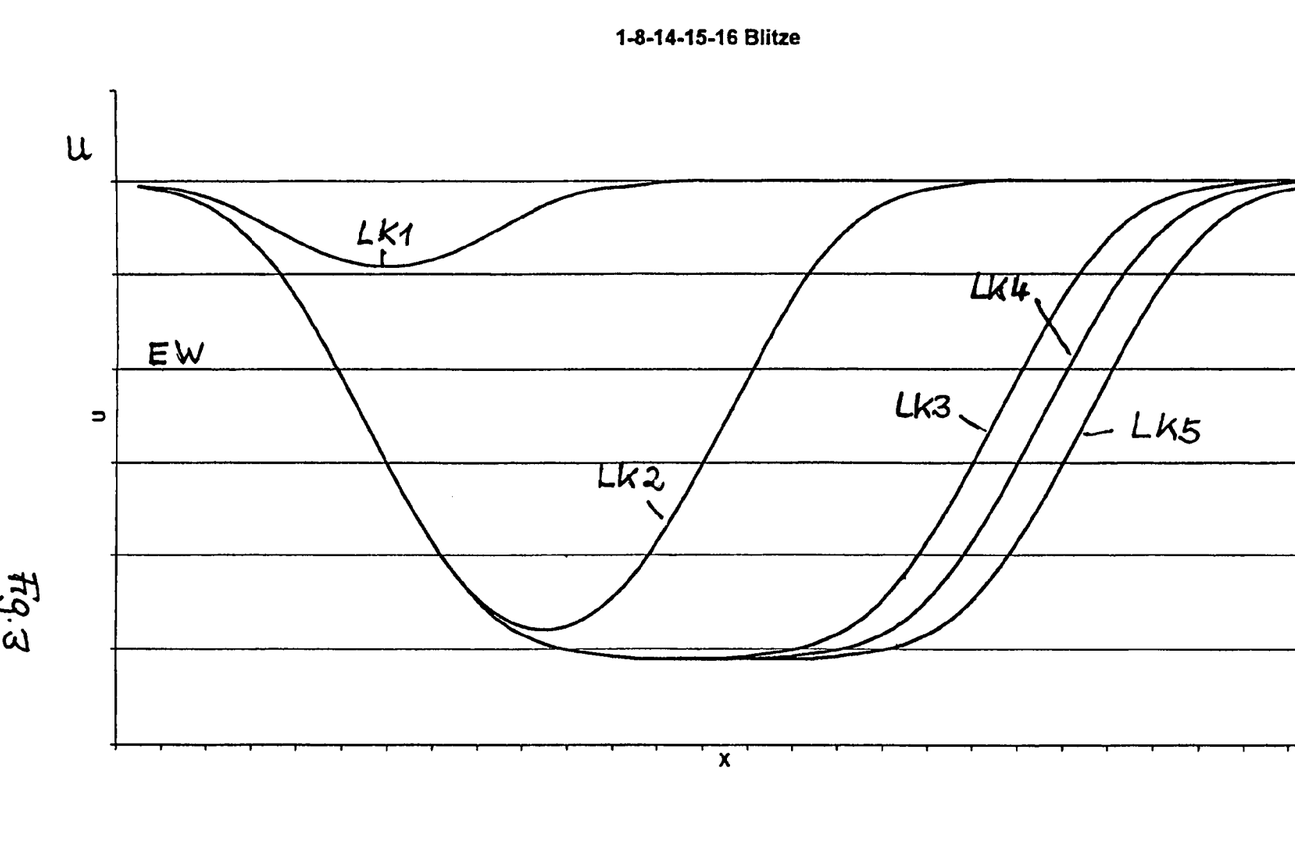
FIG. 3 is a graph which shows a representation of a discharge curve with a variable number of light pulses.

One light pulse of an LED (in a light phase) is not sufficient to discharge the intermediate support in the example of FIG. 2 up to the development threshold EW. Only the sequence of several light pulses LI, e.g. 5 light pulses, leads to the crossing of the development threshold EW. Hence, to print gray scale levels, it is not the operating period of an LED which is modulated, but rather the number and location of the light pulses. The shape of the individual light pulses is no longer of importance. Since several light pulses LI can overlay, the result is a discharge curve, which is formed from similar curves. It is important that the shape of the discharge curve in a light phase remain constant. This can be achieved by means of a short bright light pulse LI or a weaker but longer exposure. The printing speed has no influence on the resulting discharge curve. FIG. 3 shows these relationships in basic representation, the figure showing the discharge curve LK with differing numbers of light pulses LI (the voltage U is shown upon movement of the intermediate support in direction X). The trend of the discharge curve LK1 is shown with a light pulse LI, of the discharge curve LK2 with eight light pulses LI, the discharge curve LK3 with 14 light pulses LI, the discharge curve LK4 with 15 light pulses LI and the discharge curve LK5 with 16 light pulses LI, which follow one another. It can be recognized that upon the impingement of additional light pulses LI on the intermediate support only a widening of the discharge curve results.

Figure 4:
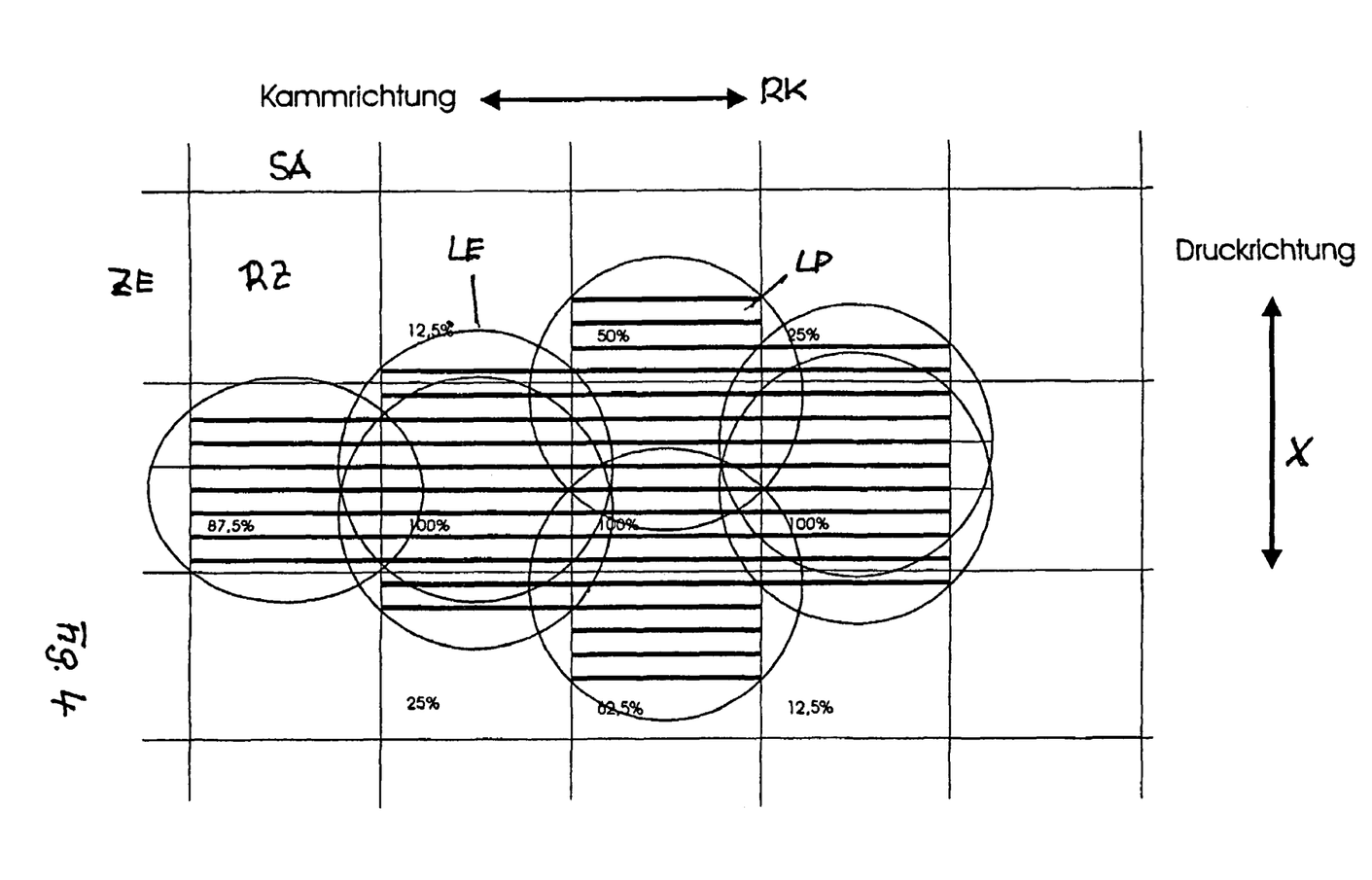
FIG. 4 is a diagram of an example of a light spot arrangement for a charge image.

FIG. 4 shows an example of the exposure and discharge of the intermediate support in basic representation. Here the region to be printed in divided into raster cells RZ arranged in rows ZE and columns SA. The light spot LE, which a light pulse LI generates on the intermediate support, is larger than the raster cell RZ. Additionally, the direction RK of the LED—comb and the printing direction X is specified. In the raster cells RZ, the light phases LP and therewith the range of the exposure or of discharge is specified in percentages. The location of the light phases LP on the intermediate support is also shown.

Figure 5:
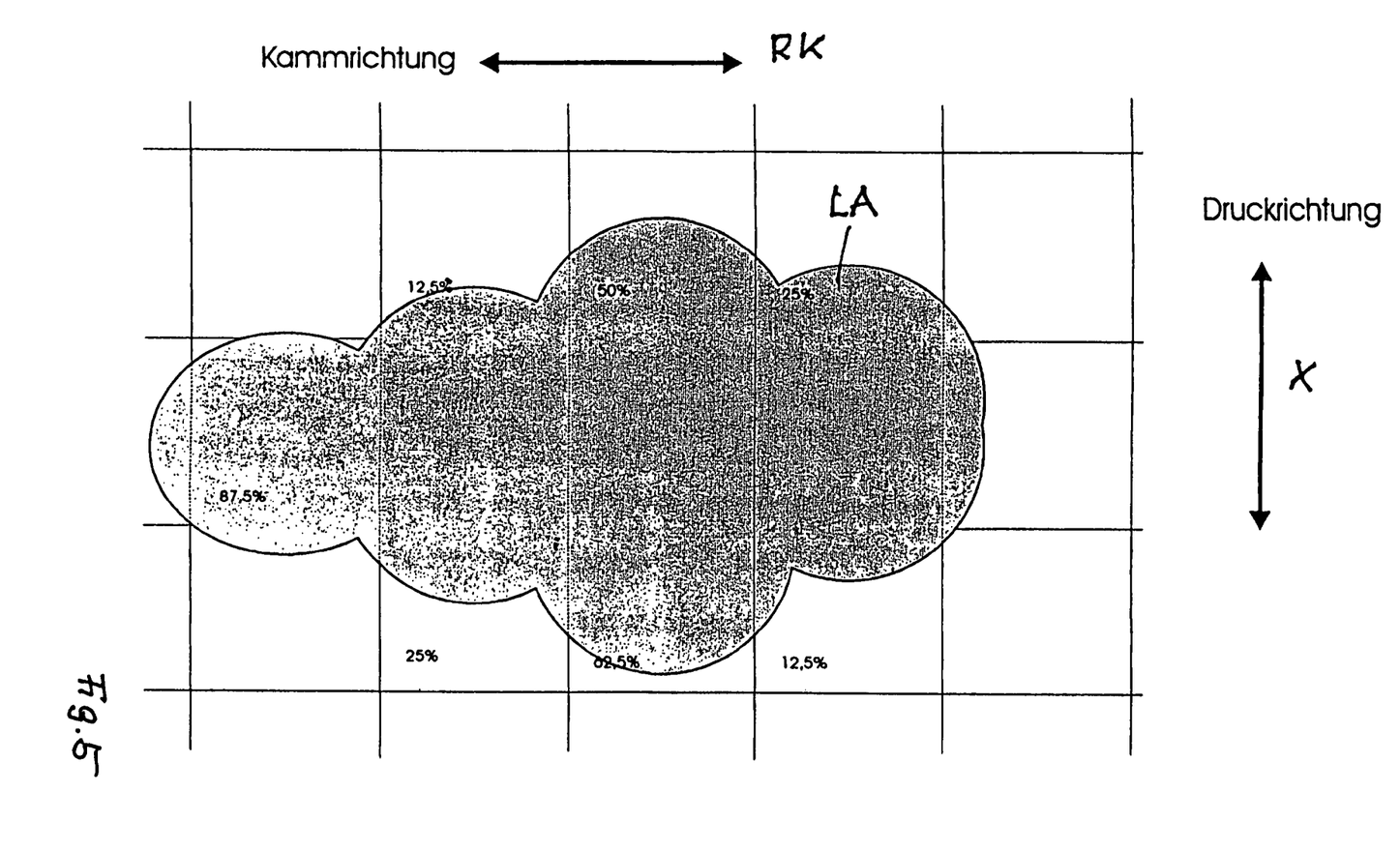
FIG. 5 is a diagram of the charge image generated on the intermediate support for the example of FIG. 4.

The resulting charge image LA on the intermediate support can be inferred from FIG. 5. The remaining representation corresponds to FIG. 4.

Under the prerequisite that for example eight light phases LP per row period of the raster cells are provided, 256 combinations of activation of an LED are possible. Of these 256 combinations of activation e.g. 16 are practical, under the prerequisite that the light pules should always directly follow one another. Then it will never be the case that an individual standing light pulse LI will be developed, but rather only light pulses in connection with a 100% exposure, for example as results from FIG. 2. Control data SD, which is in a preferred embodiment encoded of 4 BIT width, will then suffice for activation of the LEDs. The following table shows the allocation of the control data SD to the light phases LP of the LED, which specify the position of the light pulses LI and their occurrence.

TABLE

| Control Data SD | Light Phase Data LPS | | | | | | | |
|---|---|---|---|---|---|---|---|---|
| | LP1 | LP2 | | | | | | LP8 |
| 0  | 0 | 0 | 0 | 0 | 0 | 0 | 0 | 0 |
| 1  | 1 | 0 | 0 | 0 | 0 | 0 | 0 | 0 |
| 2  | 1 | 1 | 0 | 0 | 0 | 0 | 0 | 0 |
| 3  | 1 | 1 | 1 | 0 | 0 | 0 | 0 | 0 |
| 4  | 1 | 1 | 1 | 1 | 0 | 0 | 0 | 0 |
| 5  | 1 | 1 | 1 | 1 | 1 | 0 | 0 | 0 |
| 6  | 1 | 1 | 1 | 1 | 1 | 1 | 0 | 0 |
| 7  | 1 | 1 | 1 | 1 | 1 | 1 | 1 | 0 |
| 8  | 1 | 1 | 1 | 1 | 1 | 1 | 1 | 1 |
| 9  | 0 | 1 | 1 | 1 | 1 | 1 | 1 | 1 |
| 10 | 0 | 0 | 1 | 1 | 1 | 1 | 1 | 1 |
| 11 | 0 | 0 | 0 | 1 | 1 | 1 | 1 | 1 |
| 12 | 0 | 0 | 0 | 0 | 1 | 1 | 1 | 1 |
| 13 | 0 | 0 | 0 | 0 | 0 | 1 | 1 | 1 |
| 14 | 0 | 0 | 0 | 0 | 0 | 0 | 1 | 1 |
| 15 | 0 | 0 | 0 | 0 | 0 | 0 | 0 | 1 |

In the left column the control data SD are specified, in the right column the allocated light phase data LPD are specified, which indicate whether and in which place of a raster cell light pulses should be generated. In the case of the light pulses LP a "0" is entered in the table when the LED should not light up, and a "1" is entered in the table when the LED is supposed to light up.

The control data SD contain the gray levels to be printed and location information. For example the control data SD1 indicates that the light pulse in the first light phase of a raster cell is emitted, consequently the light phase data LPD1 contains a "1" only in the first place. The control data SD8 indicates that a light pulse is generated in all light phases of a raster cell (100% exposure). Hence all places of the allocated light phase data LPD8 contain a "1". From the table it can also be recognized that the light phase data LPD before light phase data LPD8 and after determine whether light pulses LI are generated before the 100% exposure or afterwards. A light phase data LPD1 for example only occurs after a light phase data LPD8; whereas a light phase data LPD9 only occurs before the light phase data LPD8.

Figure 6:
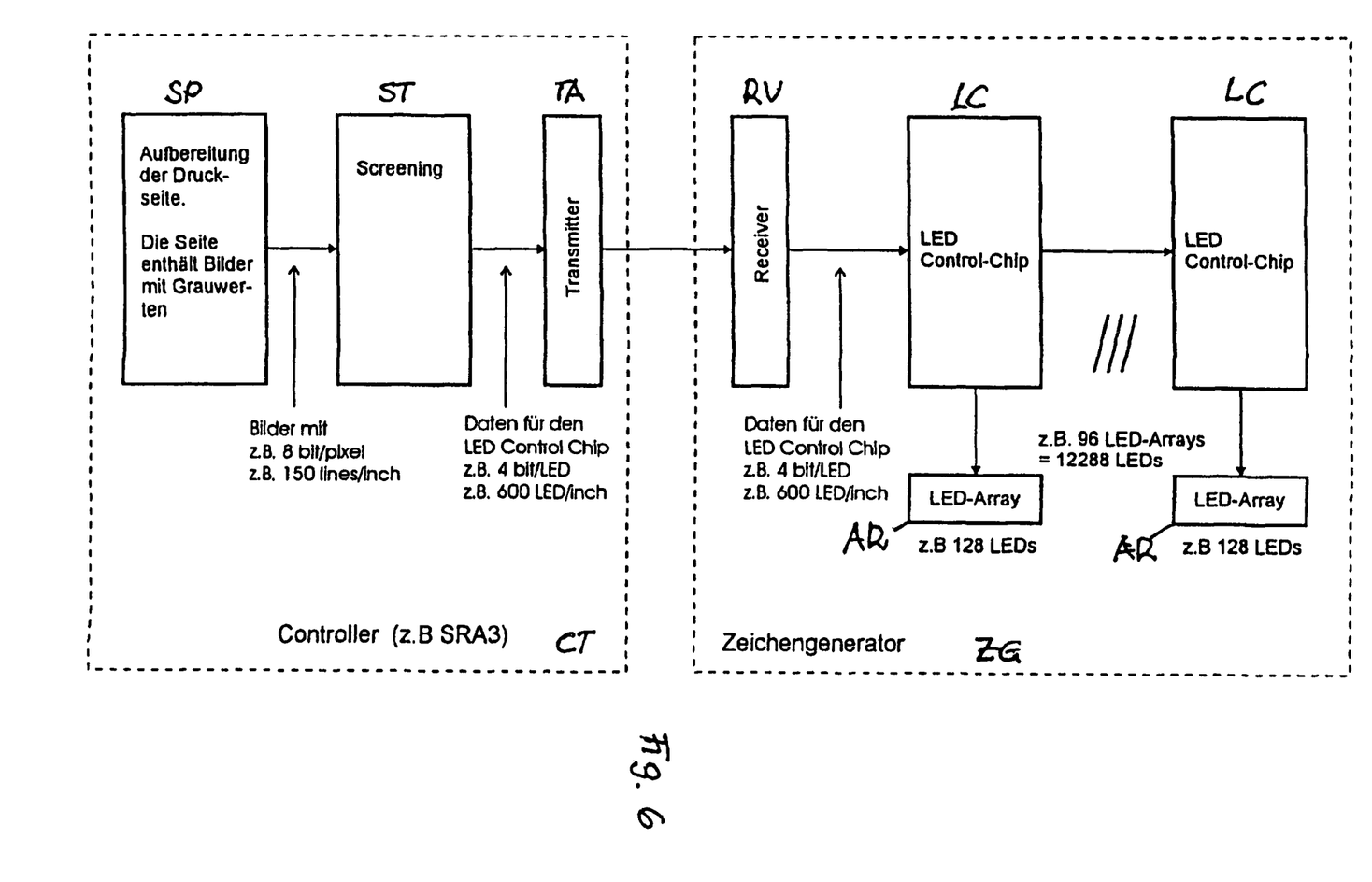
FIG. 6 is a functional block diagram showing a high-order representation of a control circuit of the exposure device.

FIG. 6 shows a control circuit from the controller CT and a character generator ZG. The controller CT exhibits a memory SP for the print data of the images to be printed, e.g. encoded with 8bit/pixel or 150 lines/inch. These print data are converted into the control data SD for the individual LEDs of the comb via a screening—table ST. The control data SD are then transferred by a transmitter TA to the character generator ZG, to be precise to the receiver RV. In the character generator ZG for example 12288 LEDs are divided into groups AR of e.g. 128 LEDs each. Each group AR has an LED control chip LC allocated to it, which controls the LEDs of the group AR of LEDs.

Figure 7:
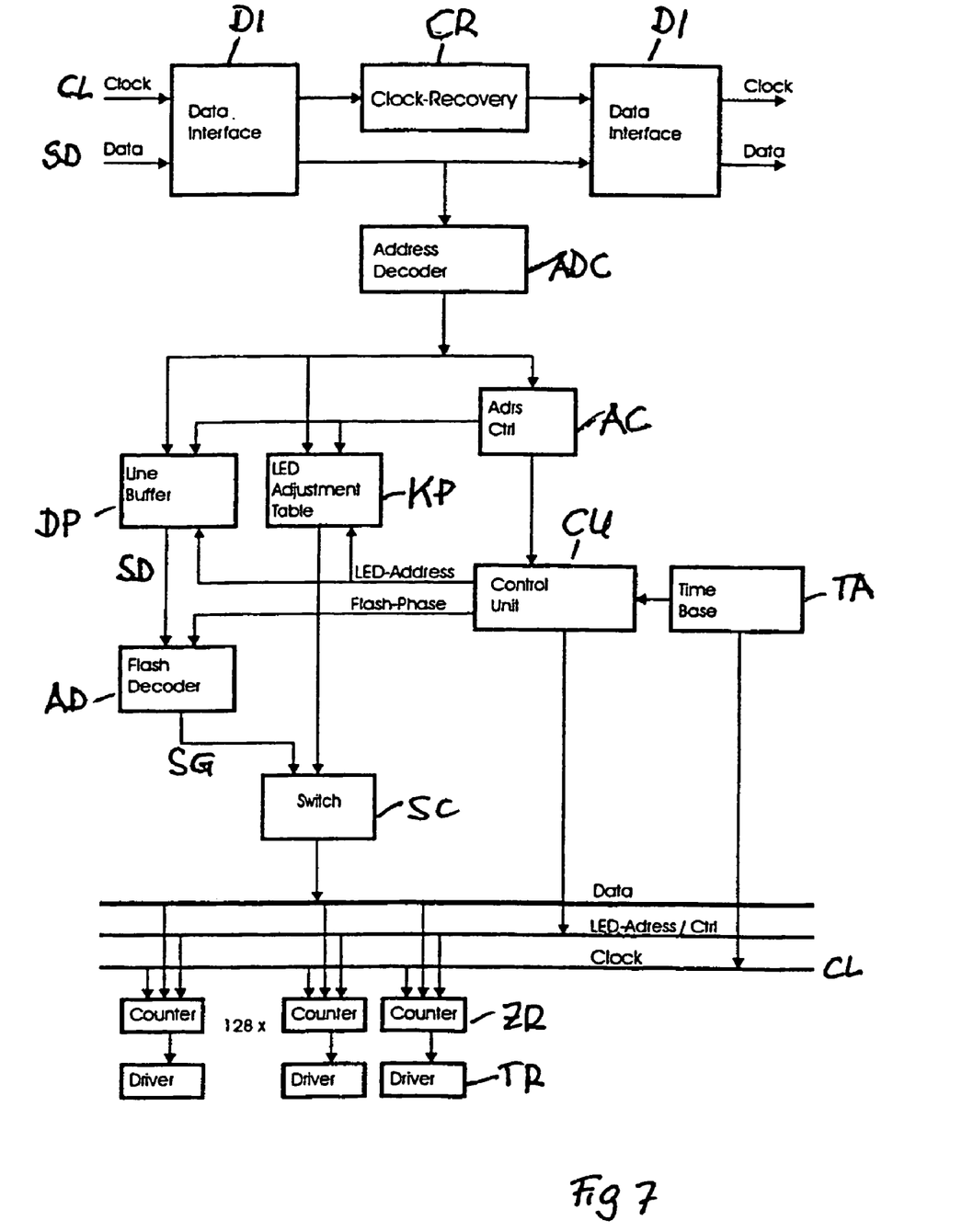
FIG. 7 is a block diagram of part of the control circuit for the LEDs.

FIG. 7 shows the structure of the control chip LC. The control data SD (named DATA) are clocked by a clock CL and fed to a data interface DI per group AR of LEDs. The control data are then forwarded to the data interface DI of the remaining groups AR. The clock CL is regenerated in a CR (clock recovery) recovery circuit. The control data allocated to a group AR are selected by an address decoder ADC. The control data SD are stored in a data buffer (line buffer) DP. Several rows of raster cells can be simultaneously stored in the process, so that the necessary row for the printout is always stored in the data buffer DP. In a correction value memory (LED adjustment table) KP the correction values for compensation of the energy quantity per light phase and LED are contained. Controlled by an address control circuit AC the control data for the LED of the group AR are stored in the data buffer DP and the correction values are addressed in the correction value memory KP. A control unit CU controls the sequence of the activation of the LED using a clock signal from the clock circuit TA. The control data SD are retrieved from the data buffer DP to a flash decoder AD, which converts the control data SD into activation values SG corresponding to the allocated light phase data LPD (according to the table). Via a switch SC the outputs of the correction value memory KP and the flash decoder AD to the addressed LED are created by means of a down counter ZR, which determines the duration of the light pulse LI. The counter output signal is then fed to a driver circuit TR for the LED, the driver circuit which operates the LED.

In the operation the control unit SU coordinates the execution. In dependency on the address of the LED, which is to emit a light pulse LI, it addresses the data buffer DP, causing the transfer of the control data SD to the flash decoder AD. The flash decoder converts the control data into activation values SG corresponding to the light phase data LPD, the activation values being added to the switch SC. When the correction value from the correction value memory KP is present, the switch SC creates a signal to the counter ZR, which is counted back to zero by the clock of the clock circuit CA. The LED lights up from the beginning of the starting of the counter ZR until achieving the value zero. In the process the duration of the light pulse is determined by the correction value, the incidence or non-incidence of the light pulse is determined by the activation value SG.

The LEDs of a group AR are connected via buses, one bus for the activation values, one bus for the addresses and one line for the clock CL.

The execution of the printing occurs therewith in the following manner:

1. The printing is started via the data interface DI (Data interface DI>Address decoder ADC>AdrsCtrl AC>Control unit CU).

2. The control unit CU starts light phase LP1.

3. The control unit CU retrieves the control data for LED1 from the data buffer DP, checks in the flash decoder AD whether it should light up in this phase and generates the activation value SG. The switch SC links the value with the correction value from the correction value memory (LED adjustment buffer) KP.

4. The control unit CU causes the transfer of the activation value via the data bus to the counter ZR and from there to the driver circuit TR operating the LED1.

5. Steps 3 and 4 are repeated for all LEDs of the group AR.

6. The control unit CU switches to the next light phase.

7. Steps 3, 4, 5 and 6 are repeated for all light phases.

8. Waiting for additional print data.

Figure 8:
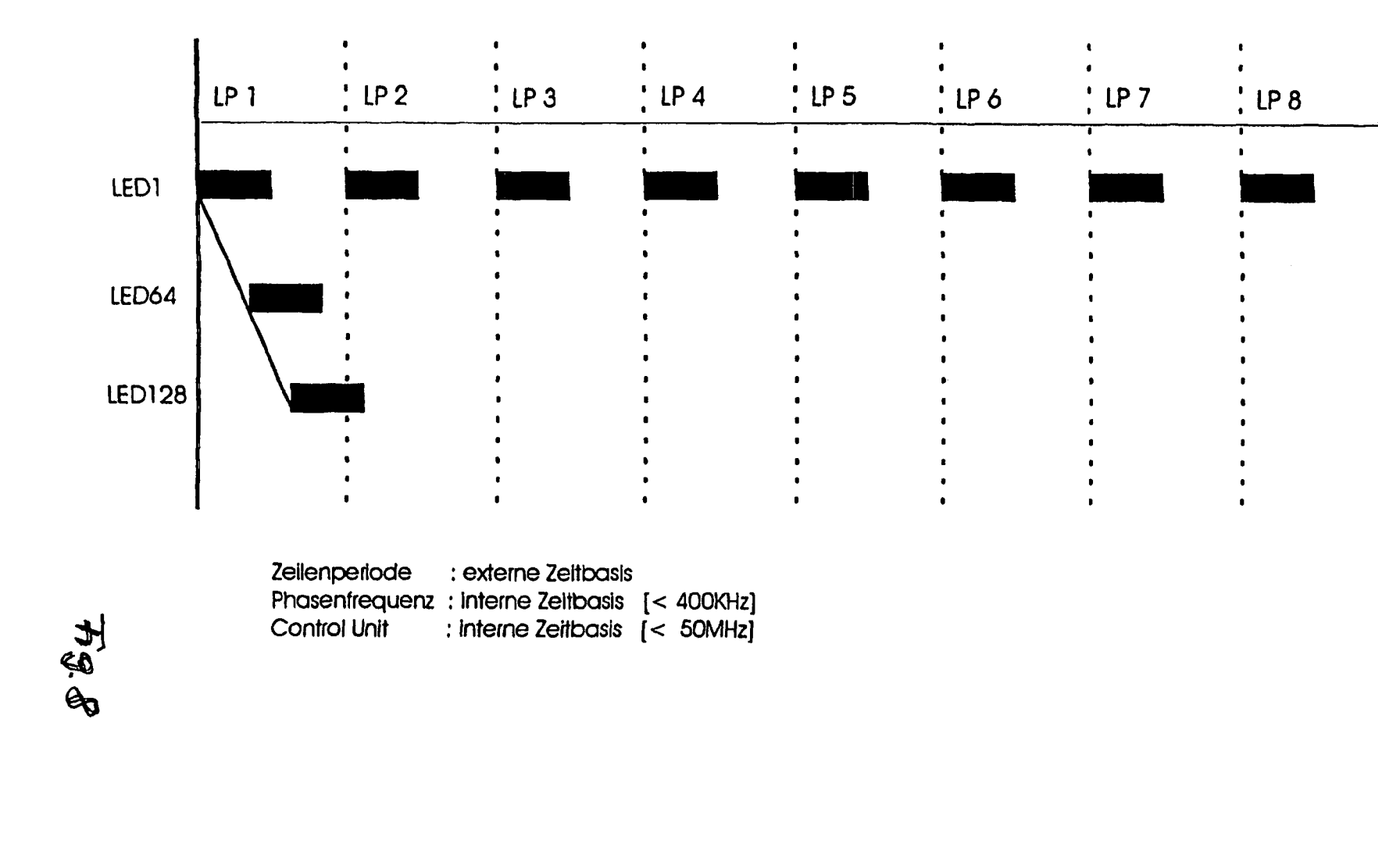
FIG. 8 is a flow chart according to which the LEDs are activated.

The arrangement of the individual circuit blocks in FIGS. 5, 6, 8 occurs in the usual manner.

FIG. 8 shows a time diagram of the activation of the LEDs of a group AR. There are eight light phases LP1–LP8 represented for the 128 LEDs of a group AR. To keep the current increase for the LEDs of the comb low, in the individual light phases LP the LEDs of a group AR are activated one after the other and either lighted or not lighted in dependence on the print data. This chronological sequence of the activation of the LEDs of a group AR takes place in all eight light phases LP1–LP8. This guarantees that no more than one LED is lighted simultaneously in a group AR per light phase LP.

Although other modifications and changes may be suggested by those skilled in the art, it is the intention of the inventors to embody within the patent warranted hereon all changes and modifications as reasonably and properly come within the scope of their contribution to the art.

The invention claimed is:

1. A method for generating charge images of images to be printed on a moving photoconductive intermediate support of an electrographic printing or copying device using LEDs as light sources, comprising the steps of:

allocating an LED to each column of raster cells in a printed image composed of rows and columns of raster cells;

activating each LED to emit a number of sequential overlapping light pulses of equal energy directed to the photoconductive intermediate support for a raster cell in a row, said number being a number from 1 to n where n is a whole number, said number depending on a level of a gray scale to be generated; and combining the light pulses of raster cells succeeding each other in a column direction into groups of light pulses allocated to a raster cells directly following one another.

2. A method according to claim 1, further comprising the step of:

forming the groups by having the light pulses allocated to a raster whose number is less than a maximum number n, said groups having the number less than the maximum number n directly preceding a raster cell whose number is equal to n to which the maximum number n of light pulses is allocated for raster cells lying before the raster cell whose number is equal to n in a column direction, said groups having the number less than the maximum number n directly following the raster cell whose number is equal to n for raster cells lying after the raster cell whose number is equal to n in a column direction.

3. A method according to claim 1, wherein said light pulses are imaged on the intermediate support in such a way that the light spot impinging on the intermediate support is larger than the raster cell.

4. A method according to claim 1, further comprising the steps of:

dividing the exposure of the raster cells by the LEDs into n light phases which are equally large, only one light pulse per LED being directed to the intermediate support per light phase.

5. A method according to claim 1, wherein a maximum number n of light pulses during a row period is equal to eight.

6. A method according to claim 1, wherein energy per light pulse is identical for all LEDs.

7. A method according to claim 1, further comprising the steps of:
applying toner to a charge image on the intermediate support when a potential of a charge image generated by the light pulses on the intermediate support crosses a development threshold, said development threshold not being reached until a number j (j=1 . . . m, m <n) of light pulses impinges on the raster cell.

8. A method according to claim 1, further comprising the step of:
controlling a length of a light pulse emitted by the LEDs by a correction value of the LED.

9. A method according to claim 1, further comprising the step of:
controlling activation and non-activation of the LEDs by activation values dependent on images to be printed.

10. A method according to claim 1, wherein a comb of adjacent LEDs is used for generation of charge images on the intermediate support, each raster cell having a row of an LED assigned to it.

11. A method according to claim 10, further comprising the step of:
dividing the LEDs of the comb into groups of LEDs; and separately activating the groups of LEDs.

12. A method according to claim 11, wherein the LEDs of a group are activated in such a way that they emit their light pulses one after the other per light phase.

13. A method according to claim 11, wherein each of the groups of LEDs includes 128 LEDs.

14. A method according to claim 13, wherein activation values for the LEDs are generated from 4 bit wide control data, said activation values being allocated light phase data of n places width via a table, each place in said table specifies whether an allocated LED emits a light pulse or not.

15. An arrangement for generating charge images of images to be printed on a moving photoconductive intermediate support of an electrogaphic printing or copying device using LEDs as light sources, comprising:

an arrangements of LEDs disposed to direct light onto the photoconductive intermediate support;

a controller;

a data storage connected so said controller, said data storage storing print data of images to be printed;

said controller converting print data into control data via a screening table, said control data which specifying a location and number of the light pulses per LED; and a character generator connected to said controller, said character generator including a control chip which converts the control data into activation values for the LEDs, said activation values connected to control lighting of the LEDs; said LEDs being arranged in a comb of LEDs, said character generator being connected in such a way to said comb of LEDs that said LEDs are divided into groups of LEDs; and a control chip is allocated to each group of LEDs, said control chip selecting control data allocated to the group from control data fed to said character generator, said control chip including:

a data buffer in which the control data of several rows of raster cells are stored;

a flash decoder which generates allocated light phase data from the control data of the data buffer and generates activation values for individual LEDs from said light phase data;

a control unit which is controlled by a clock signal to forward the control data from said data buffer to said flash decoder and causes the emission of allocated correction values from said correction value memory;

one down counter per LED, said down counters having an initial value set by the correction value and which is counted back by the clock signal when the activation value specifies an emission of a light pulse.

* * * * *